(12) United States Patent
Darby

(10) Patent No.: US 10,451,096 B2
(45) Date of Patent: Oct. 22, 2019

(54) MULTIFUNCTIONAL REVERSIBLE CLIP

(71) Applicant: Randall Lynn Darby, Chicago, IL (US)

(72) Inventor: Randall Lynn Darby, Chicago, IL (US)

( * ) Notice: Subject to any disclaimer, the term of this patent is extended or adjusted under 35 U.S.C. 154(b) by 0 days.

(21) Appl. No.: 15/684,931

(22) Filed: Aug. 23, 2017

(65) Prior Publication Data

US 2019/0063477 A1  Feb. 28, 2019

(51) Int. Cl.
| | |
|---|---|
| *A47G 1/10* | (2006.01) |
| *F16B 2/18* | (2006.01) |
| *F16M 13/02* | (2006.01) |
| *F41C 33/00* | (2006.01) |

(52) U.S. Cl.
CPC .............. *F16B 2/185* (2013.01); *F16M 13/02* (2013.01); *F41C 33/00* (2013.01)

(58) Field of Classification Search
CPC ..................................................... F16M 13/02
USPC ........ 248/316.2, 313, 231.31, 231.51, 231.9; 24/11 R, 499, 532, 538; 211/120
See application file for complete search history.

(56) References Cited

U.S. PATENT DOCUMENTS

| | | | | |
|---|---|---|---|---|
| 2,932,873 A | * | 4/1960 | Reichert | A61G 7/05 24/134 R |
| 3,907,182 A | * | 9/1975 | Bryant | F16B 2/185 224/670 |
| 4,085,997 A | * | 4/1978 | Hainsworth | C25D 17/06 439/729 |
| 5,615,851 A | * | 4/1997 | LeBeau | F16B 2/185 248/73 |
| 6,568,644 B2 | * | 5/2003 | Pedersen | B62J 7/08 224/309 |
| 2016/0058168 A1 | * | 3/2016 | Reed | A45F 5/02 24/3.12 |
| 2018/0119714 A1 | * | 5/2018 | Moreau | F16B 2/005 |

FOREIGN PATENT DOCUMENTS

| | | | | |
|---|---|---|---|---|
| CA | 1087148 A | * | 10/1980 | ........... F16K 31/404 |
| GB | 2104586 A | * | 3/1983 | ............... B25B 5/02 |

* cited by examiner

*Primary Examiner* — Gwendolyn W Baxter
(74) *Attorney, Agent, or Firm* — FisherBroyles, LLP; Edward R. Ergenzinger

(57) ABSTRACT

A three part reversible clamping retention clip is provided comprising a mounting area for attachment to a holster, bag, pouch or other device and a clamping head with adjacent flap for reversible and secure engagement to a material worn by the user.

9 Claims, 6 Drawing Sheets

MULTIFUNCTIONAL REVERSIBLE CLIP

CROSS REFERENCE TO RELATED APPLICATIONS

This application claims priority to U.S. Provisional Patent Application No. 62/403,129, filed Oct. 1, 2016, which is hereby incorporated by reference in its entirety.

BACKGROUND OF THE INVENTION

The present invention primarily relates to firearm holsters, but is not entirely limited to firearm holsters and can be adapted and used on a variety of knife sheaths, pouches and/or bags.

Holsters are used to carry many different items, including hand-held firearms. Handheld firearms, also known as pistols, for the most part pistols are carried in some type of holster. Holsters are primarily used to provide retention so that the pistol remains in a certain location. Most holsters rely on a metal or plastic clip to secure the holster in the place that a person desires to carry or store the pistol. A problem with traditional holsters clips is that they do not permit the user to reverse the clip while at the same time allowing adjustable clamping strength and allowing for variable thickness of material.

Traditional holster clips require a secondary accessory like a belt to in order to provide retention. A main concern when removing a pistol from its holster is that holster clip should have enough retention to maintain the holster it in the affixed location. If the clip detaches, it would effectively render the pistol unusable in the event of a life threatening situation.

Traditional clips are attached to holsters, knife sheaths or other items and solely function to allow those items to be carried or stored. The present invention can be used like a traditional clip while at the same time providing multi hand-held tool capabilities.

Presently there is no solution that allows a person to securely carry a holster or other item inside the waistband and outside the waistband while at the same time providing multi hand-held tools, reversibility of the clip and allowing for variable thickness of material.

SUMMARY OF THE INVENTION

The present invention seeks to provide a solution to the inherent limitations of tradition holster clips by providing a multifunctional reversible clip that offers adjustable retention allowing for variable thickness of material for holsters, knife sheaths, bags or pouches. The clamping mechanism of the clip may be reversed allowing it to be mounted from either side. This reversible function permits it to be mounted on a wider variety of products therefore increasing its application compared to traditional holster clips.

In addition to being used like a traditional holster clip the current invention can also can be crafted to incorporate a multifunctional hand-held tool.

DETAILED DESCRIPTION OF THE DRAWINGS

Figure 1:
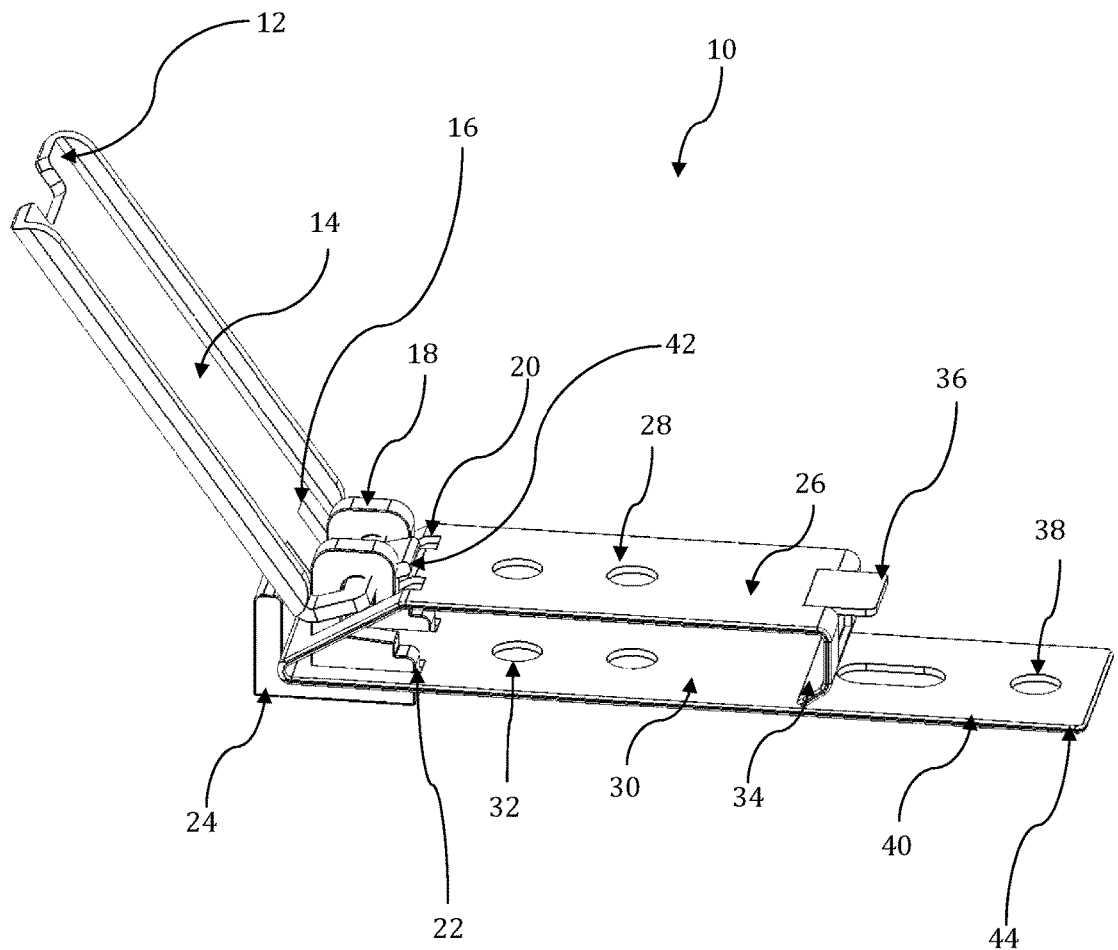

FIG. 1 is an angled assembled side view of the Multi-function Reversible Clip 10. The Multifunctional Clip is made up of three main parts, the flap 14, backplate 44 and hooked bracket 24.

Figure 2:
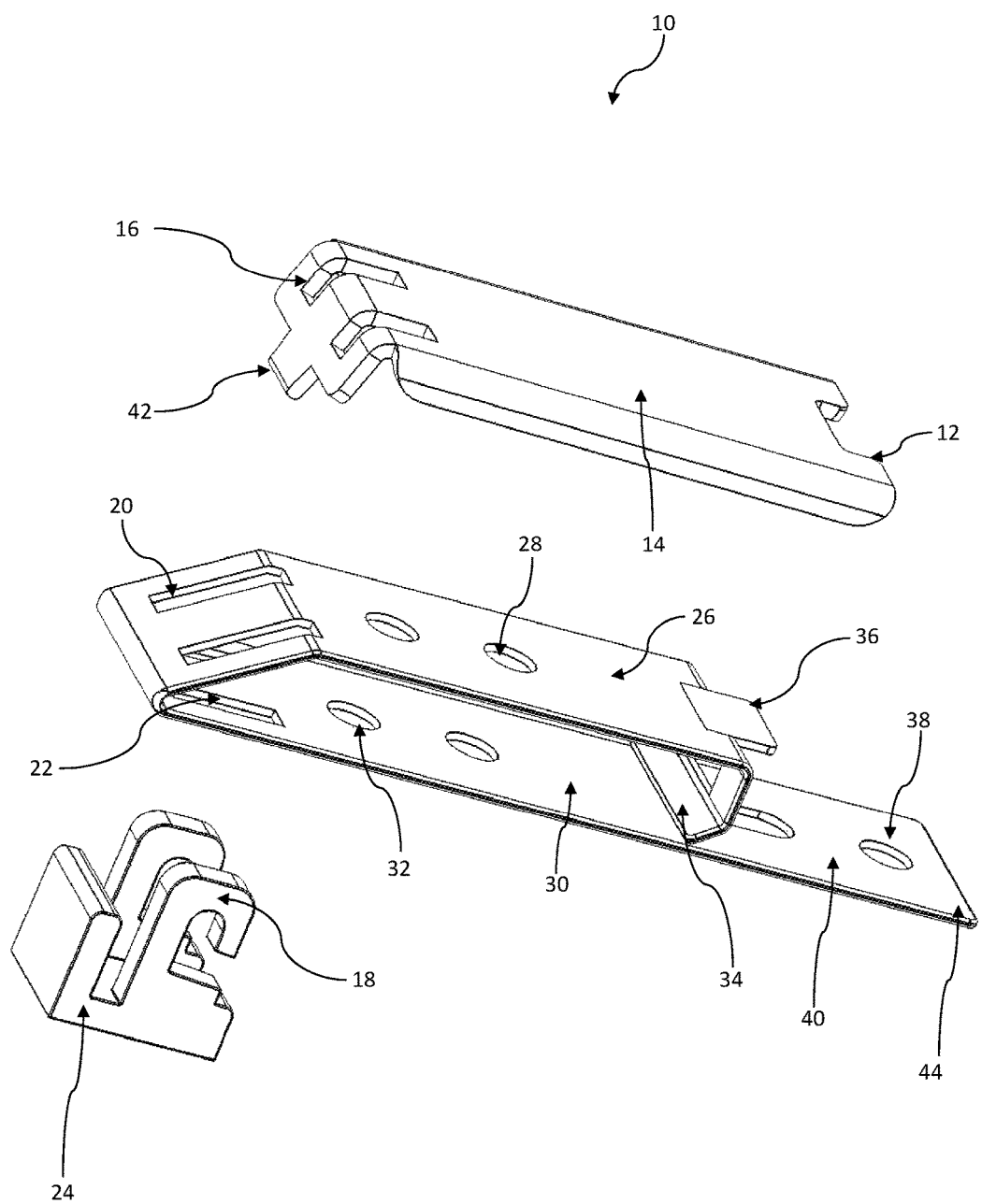

FIG. 2 is an angled disassembled side view of the Multifunctional Reversible Clip 10 revealing the three main parts the flap 14, backplate 44 and hooked bracket 24.

Figure 3:
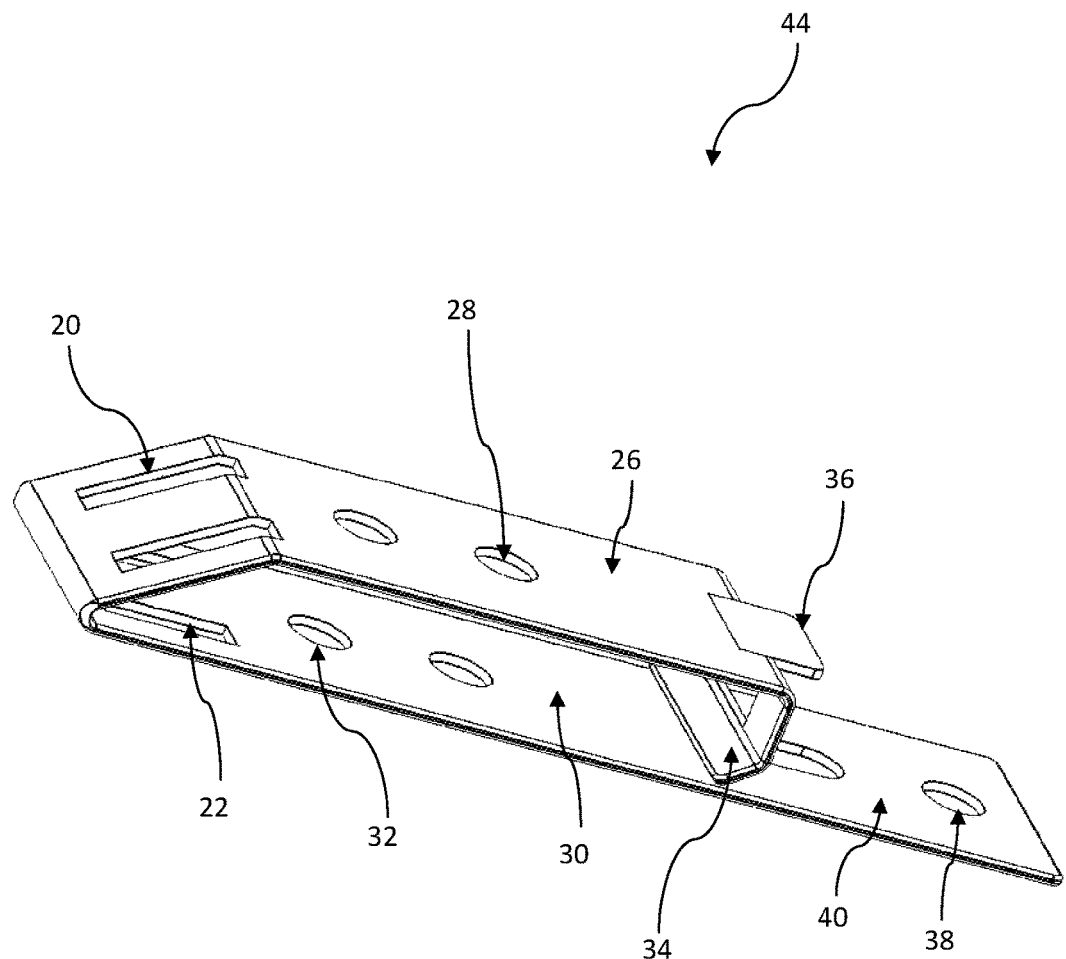

FIG. 3 is an angled view of the backplate 44.

Figure 4:
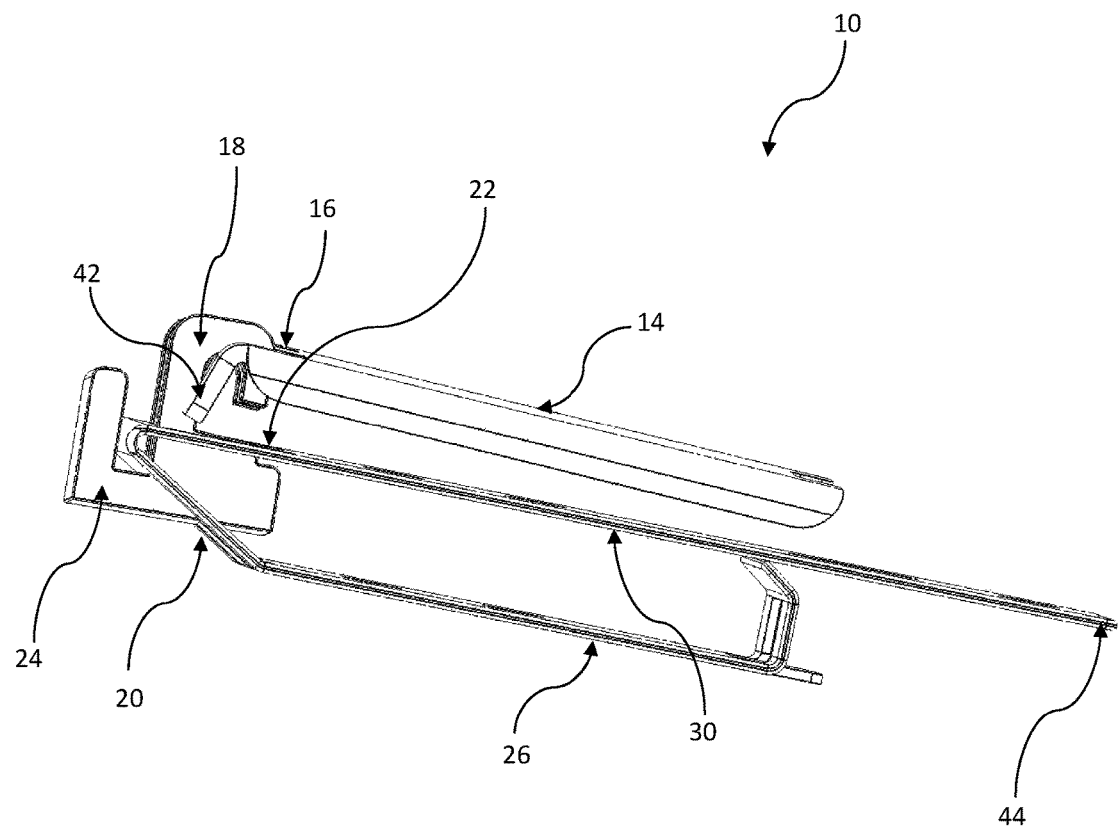

FIG. 4 is an angled assembled side view of the Multi-function Reversible Clip 10 showing the reverse assembly of the three main parts, the flap 14, backplate 44 and hooked bracket 24.

Figure 5:
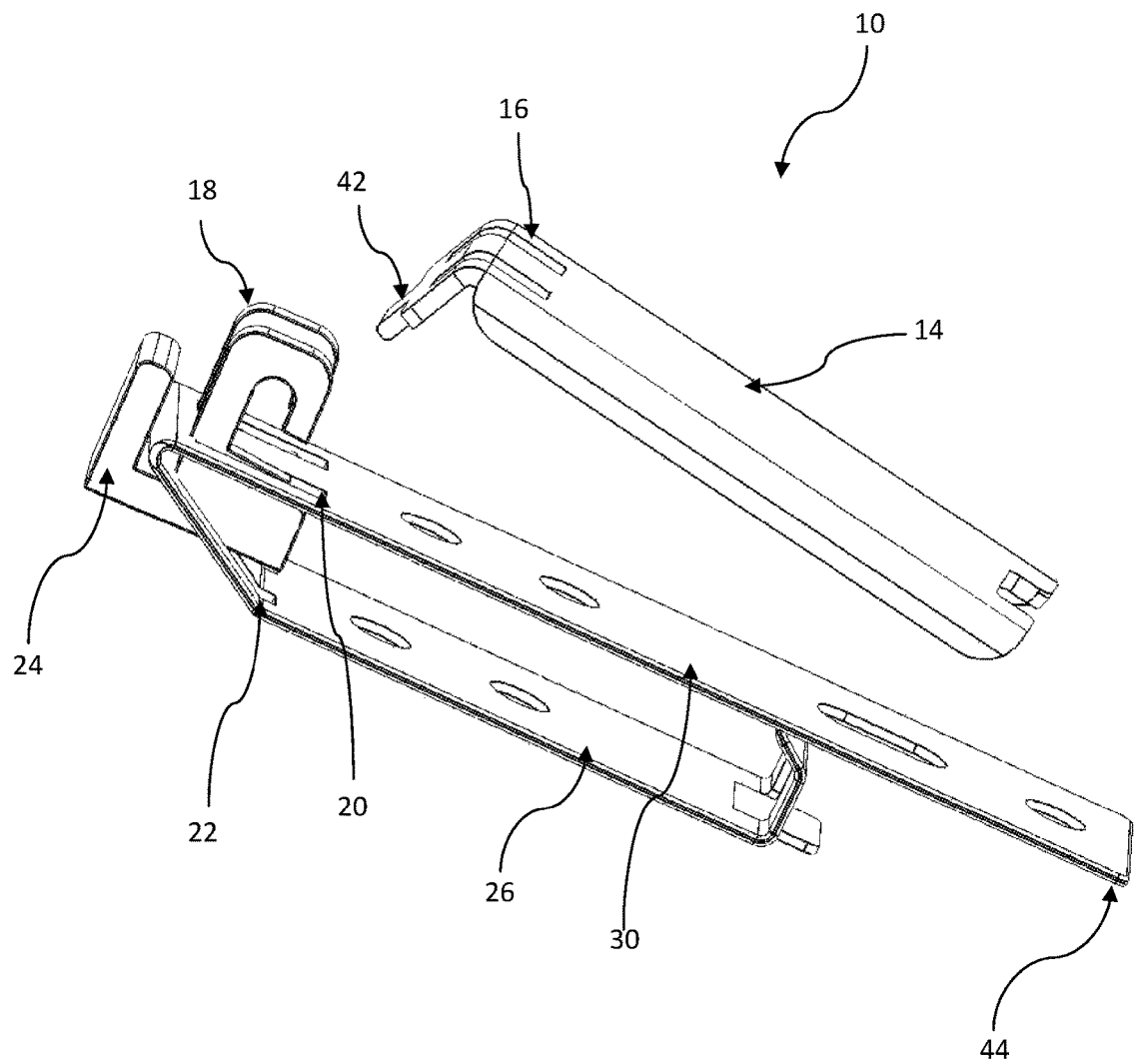

FIG. 5 is an angled side view of the Multifunction Reversible Clip 10 showing the reverse assembly of the of three main parts with the hooked bracket 24 installed on the backplate 44 and dissembled flap 14.

Figure 6:
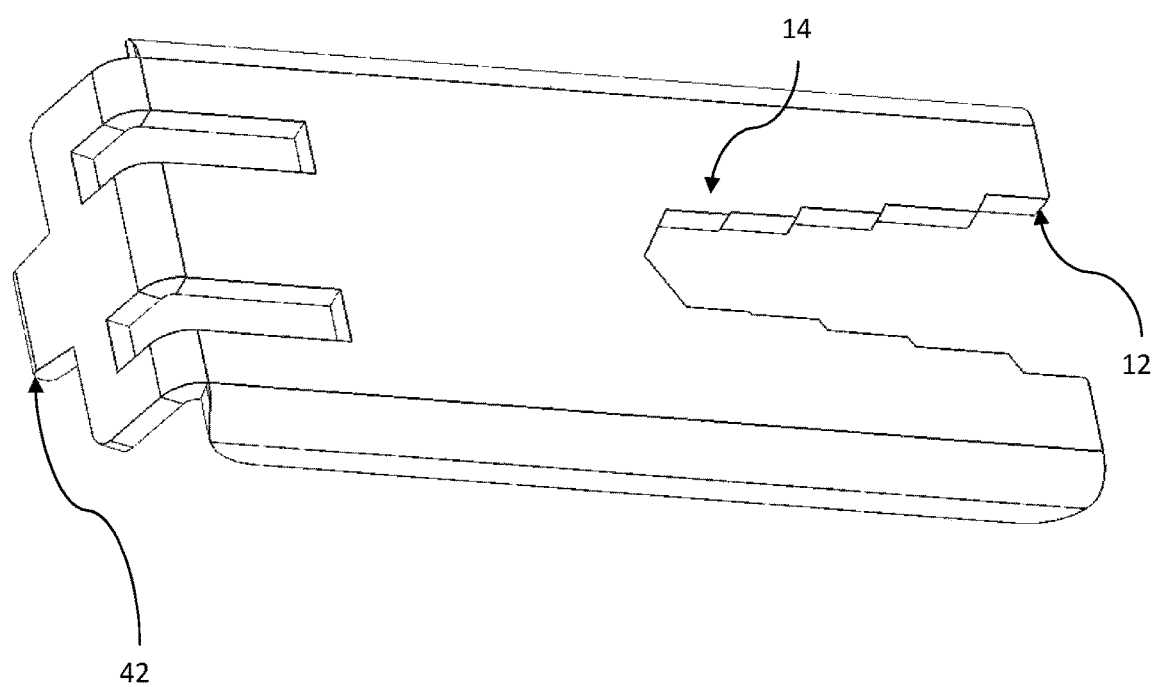

FIG. 6 is an angled side view showing the multi hand-help tools options of the flap 14. The compression tab 42 functions as a flat blade screw driver, the flap lift tab 12 functions as a bottle opener and the flap 14 can be fashioned into a multi sized wrench.

DETAILED DESCRIPTION OF THE INVENTION

The Multifunction Reversible Clip has an angled compression head that relies on leverage and pressure to produce a higher level of retention. When the flap is rotated toward the clip the compression tab produces pressure on the angled compression head and provides greater retention than found on traditional holster clips.

The clip, flap and hooked bracket are constructed independently using a single piece of metal or plastic to make each part The clip, flap and hooked bracket once constructed are assembled make the multifunctional reversible clip. The flap is rotated manually thus providing leverage and pressure to secure the angled compression head.

The present invention will now be more particularly described, with reference to the accompanying drawings, by way of example only and in no way limiting the scope of the invention.

Referring to the drawings, there is shown the Multifunctional Reversible Clip 10 which consists of a flap lift tab 12, flap 14, flap slots 16, hooked bracket post 18, upper bracket slot 20, lower bracket slot 22, hooked bracket 24, upper mounting plate 26, upper mounting hole 28, lower mounting plate 30, lower mounting hole 32, angled compression head 34, clamping head lift tab 36, primary mounting hole 38, primary mounting plate 40, compression tab 42, and the backplate 44. [001619] The backplate 44 is not limited to but preferably fashioned out of either metal or plastic and is folded, bent or molded to provide the, upper bracket slot 20, lower bracket slot 22, upper mounting plate 26, upper mounting hole 28, lower mounting plate 30, lower mounting hole 32, angled compression head 34, clamping head lift tab 36, primary mounting hole 38, and primary mounting plate 40. [001720] The flap 14 is fabricated independently of the backplate 44 and hooked bracket 24.

The backplate 44 is not limited to but preferably fashioned out of either metal or plastic and is folded, bent or molded to provide the, upper bracket slot 20, lower bracket slot 22, upper mounting plate 26, upper mounting hole 28, lower mounting plate 30, lower mounting hole 32, angled compression head 34, clamping head lift tab 36, primary mounting hole 38, and primary mounting plate 40.

The flap 14 is fabricated independently of the backplate 44 and hooked bracket 24.

The hooked bracket 24 is fabricated independently of the backplate 44 and flap 14.

For normal assembly of the Multifunctional Reversible Clip 10 as shown in FIG. 1 the flap 14, backplate 44 and bracket 24 are required. The hooked bracket 24 is first assembled to the backplate 44 by inserting the hooked bracket posts 18 through lower bracket slots 22 this process is continued until the hooked bracket posts 18 pass through the upper bracket slots 20. Once the hooked bracket 24 is assembled to the backplate 44 the flap 14 is ready for assembly. To assemble the flap 14 first rotate the flap 14 so that the compress tab 42 is at a 31 degree angle in relation to the upper mounting plate 26. By hand manually compress the upper mounting plate 26 and the lower mounting plate 30. Once compressed there will be a gap between the hooked bracket posts 18 and the upper bracket slots 20. Align the flap slots 16 with the hooked bracket post 18. Slide the flap slots 16 through the hooked bracket post 18 until full inserted and release the compressed upper mounting plate 26 and lower mounting plate 30. The Multifunctional Reversible Clip is now in its normal assembled state as shown in FIG. 1.

For reversible assembly of the Multifunctional Reversible Clip 10 as shown in FIG. 4 the flap 14, backplate 44 and compression hooked bracket 24 are required. The compression hooked bracket 24 is first assembled to the backplate 44 by inserting the hooked bracket posts 18 through the upper bracket slots 20 this process is continued until the hooked bracket posts 18 pass through the lower bracket slots 22. Once the hooked bracket 24 is assembled to the backplate 44 the flap 14 is ready for assembly. To assemble the flap 14 first rotate the flap 14 so that the compression tab 42 is parallel in relation to the lower mounting plate 30. By hand manually compress the upper mounting plate 26 and the lower mounting plate 30. Once compressed there will be a gap between the hooked bracket posts 18 and the lower bracket slots 22. Align the flap slots 18 with the hooked bracket post 18. Slide the flap slots 18 through the hooked bracket post 18 until full inserted and release the compressed upper mounting plate 26 and lower mounting plate 30. The Multifunctional Reversible Clip is now in its reversed assembled state as shown in FIG. 4.

The flap 12 can be removed from the backplate 44 and the hooked bracket 24. Once the flap 14 is removed from the backplate 44 and the hooked bracket 24 it can be used as a multi handheld tool. The compression tab 42 functions as a flat blade screw driver and the flap lift tab 12 can be used as a bottle opener. When manufactured the flap 14 can optionally be fashioned in an into a multi sized wrench as shown in FIG. 6.

The Multifunctional Reversible Clip may also comprise a flap configured to enable manual removal from the clip without tools, rotation of the flap 180 degrees, and reinstallation, thereby enabling bi-directional clamping ability.

The invention will now be described in use with reference to a preferred embodiment. In use, the Multifunctional Reversible Clip is attached to a firearm holster, knife sheath, pouch or bag to provide better retention.

Once the Multifunctional Reversible Clip is attached to a holster, knife sheath, bag or pouch it is used much in the same way as a traditional holster, knife sheath pouch or bag clip with the exception of how it provides its retention onto the material where it will be attached.

The Multifunctional Reversible Clip is placed in a location and the angled compression head is placed around the desired material when it is in its open state. The Multifunctional Reversible Clip is considered open when the flap is at an angle greater than 80 degree from the mounting plate. Likewise, the Multifunctional Reversible Clip is considered closed when the flap is at an angle of 5 degrees or less from the mounting plate.

The Multifunctional Reversible Clip provides its retention when the flap is manually rotated down toward the mounting plate and applies downward pressure to the angled compression head. When in the open position the flap may be turned clockwise to increase the level of retention or it may be turned counterclockwise to decrease the level of retention. When the gap between the angled compression head and the mounting plate decreases, the retention capability of the Multifunctional Reversible Clip increases.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A multifunctional reversible clip comprising:
   a backplate, comprising upper bracket slots, one or more upper mounting holes, an upper mounting plate, a clamping head lift tab, lower bracket slots; a lower mounting plate; one or more lower mounting holes; an angled compression head; a primary mounting hole; and a primary mounting plate;
   a flap, comprising a flap lift tab, flap slots, and a compression tab; and
   a hooked bracket, comprising [a] hooked bracket posts;
   wherein the hooked bracket posts and the backplate are configured to allow the hooked bracket to assemble to the backplate via inserting the hooked bracket posts through the lower bracket slots until the hooked bracket posts pass through the upper bracket slots; and
   wherein the flap slots are aligned with the hooked bracket posts.

2. The clip of claim 1, wherein each of the backplate, the flap, and the hooked bracket are independently constructed from a single piece of metal or plastic.

3. The clip of claim 1, wherein the clip is configured to allow the flap to be rotated manually to provide leverage and pressure to secure the angled compression head.

4. The clip of claim 1, wherein the clip is configured to allow manual disassembly without tools, wherein disassembly comprises separating the backplate, the flap, and the hooked bracket from each other.

5. The clip of claim 1, wherein the clip is configured to receive a material in between the angled compression head and mounting plate upon rotation of the flap to about 5 degrees from the mounting plate and release the material upon rotation of the flap to above about 85 degrees.

6. The clip of claim 1, wherein the angled compression head further comprises a gripping portion.

7. The clip of claim 1, wherein the flap is configured into a multi-tool that may be manually removed from the clip without tools.

8. The clip of claim 1, wherein the flap is configured to enable manual removal from the clip without tools, rotation of the flap 180 degrees, and reinstallation, thereby enabling bi-directional clamping ability.

9. A clip kit comprising:
   a backplate, comprising upper bracket slots, one or more upper mounting holes, an upper mounting plate, a clamping head lift tab, lower bracket slots; a lower mounting plate; one or more lower mounting holes; an angled compression head; a primary mounting hole;

and a primary mounting plate;
a flap, comprising a flap lift tab, flap slots, and a compression tab; and
a hooked bracket, comprising a hooked bracket post;
wherein the backplate, the flap, and the hooked bracket are provided disassembled, and wherein the kit further comprises instructions for assembling the backplate, the flap, and the hooked bracket into a clip;
wherein the hooked bracket posts and the backplate are configured to allow the hooked bracket to assemble to the backplate via inserting the hooked bracket posts through the lower bracket slots until the hooked bracket posts pass through the upper bracket slots; and
wherein the flap slots are aligned with the hooked bracket posts.

\* \* \* \* \*